United States Patent [19]

Tranchon

[11] Patent Number: 5,230,397
[45] Date of Patent: Jul. 27, 1993

[54] DISCONTINUOUS POWER ASSISTANCE MECHANISM FOR A STEERING COLUMN OF A VEHICLE HAVING STEERABLE WHEELS

[75] Inventor: Georges Tranchon, Creteil, France

[73] Assignee: Valeo Systemes D'Essuyage, Montigny-Le Bretonneux, France

[21] Appl. No.: 807,160

[22] Filed: Dec. 13, 1991

[30] Foreign Application Priority Data

Dec. 19, 1990 [FR] France .................. 90 15908

[51] Int. Cl.$^5$ .......................................... B62D 5/04
[52] U.S. Cl. .................. 180/79.1; 74/388 PS
[58] Field of Search ............... 180/79.1, 146, 141, 180/142; 74/388 PS

[56] References Cited

U.S. PATENT DOCUMENTS

| 4,724,917 | 2/1988 | Naito et al. | 180/79.1 |
|---|---|---|---|
| 4,898,258 | 2/1990 | Ohe et al. | 180/79.1 |
| 4,921,061 | 5/1990 | Asano | 180/79.1 |
| 4,934,473 | 6/1990 | Fushimi et al. | 180/79.1 |
| 4,984,647 | 1/1991 | Morishita et al. | 180/79.1 |
| 5,145,021 | 9/1992 | Nakamura et al. | 180/79.1 |

FOREIGN PATENT DOCUMENTS

| 0274541 | 7/1987 | European Pat. Off. |
| 0391773 | 3/1990 | European Pat. Off. |
| 2204169 | 5/1974 | France |

*Primary Examiner*—Robert J. Oberleitner
*Assistant Examiner*—Kevin Hurley
*Attorney, Agent, or Firm*—Morgan & Finnegan

[57] ABSTRACT

A mechanism for supplying power assistance to the steering column of a vehicle is arranged to operate in response to signals indicating that power assistance is required, and therefore has periods in which it is inoperative and periods in which it is operative, all while the vehicle is in motion. The mechanism comprises a motor driving a speed reducing mechanism which is coupled to the steering column. The mechanism includes an epicyclic gear train, the planet wheel carrier of which is fitted around the steering column, the epicyclic gear train being driven by the power assistance motor. The outer crown of the epicyclic gear train is mounted so as to be free to rotate about the steering column, but when power assistance is required the outer crown is prevented from rotating by means of a releasable blocking or braking means actuated by an electro-magnet, thus causing the planet wheel carrier to rotate the steering column.

4 Claims, 2 Drawing Sheets

DISCONTINUOUS POWER ASSISTANCE MECHANISM FOR A STEERING COLUMN OF A VEHICLE HAVING STEERABLE WHEELS

FIELD OF THE INVENTION

The present invention relates to a discontinuous power assistance mechanism for assisting the steering column of a vehicle having steerable wheels.

BACKGROUND OF THE INVENTION

In the prior art, it has in the past been proposed to provide various kinds of power assistance means for assisting the rotation of the steering column in a steerable vehicle. In general, such a mechanism includes a motorised speed reducing means comprising essentially an electric motor and a speed reducing means or gearbox. The output shaft of the motor is coupled through an output pinion, or any other suitable means of transmission, in such a way that it is coupled mechanically with the steering column or with a pinion or gear wheel mounted on the latter. Because of this, detection of the forces exerted by the driver on the steering wheel, for example by means of a sensor for detecting angle of rotation or a sensor which detects the torque exerted on the steering wheel, enables a command to be produced for appropriate proportional action of the motorised speed reducing means, so as to apply the required additional power to assist operation of the steering column.

Pneumatic or hydraulic power assistance systems for steering have also been proposed, although the preferred embodiment of the present invention uses an electric motor as the source of mechanical energy to be used for assisting the steering. In a first type of power assisted steering system, the motorised speed reducing means or source of mechanical assistance energy is compelled to follow complex instructions such that it can provide power assistance under widely differing driving conditions. Such systems are expensive and complicated, and their reliability is affected accordingly.

Therefore, it has also been proposed to arrange the power assisted steering system such that it is only activated temporarily, i.e. during those periods when assistance is actually required, for example when it is called for by particular driving conditions or when the driver is exerting too much effort on the steering wheel. Such a system can therefore be said to be acting intermittently. Power assistance is especially valuable during parking, while the vehicle is moving slowly and the driver has a frequent need to exert relatively high forces on the steering wheel. However the same is also true for steering at low speed in general.

In this type of power assisted steering system, when the speed of the vehicle exceeds a certain limited value the power assistance is no longer operative, and the driver feels a resistive torque on the steering column. This resistive torque is caused partly by the forces exerted by the road on the road wheels, and partly by the inertia of the motorised speed reducing means, that is to say mainly the inertia of the rotatable parts of the latter. This feature of systems in the prior art is of special disadvantage in that the multiplication ratio of the speed reducer causes the inertia of the rotor of the electric motor to play a dominant part in the generation of the resistive forces. This somewhat negates the additional convenience afforded by this kind of temporary power assistance mechanism, even though it does have the advantage of being cheaper than a conventional "all speeds" power assistance system.

DISCUSSION OF THE INVENTION

An object of the present invention is to overcome the above mentioned disadvantage.

According to the invention, a mechanism for providing discontinuous power assistance for the steering column of a steerable vehicle, of the kind that comprises a motorised speed reducing mechanism, in which the rotor of the motor is engaged in mesh with a toothed wheel coupled with the steering column, is characterised mainly in that it includes an actuating means which only couples the power assistance motor to the steering column during periods in which power assistance is to be applied to the steering column.

The actuating means in a mechanism according to the invention is very well adapted to the use of a speed reducing mechanism in the form of an epicyclic gear train. With an epicyclic gear train, the torque derived from the motor is not transmitted to the steering column, on the shaft of which the planet wheel carrier of the epicyclic speed reducing mechanism is mounted, if the outer crown, in which the planet wheels are meshed, is free to rotate. According to a preferred feature of the invention, therefore, the actuating means comprises a releasable blocking means which is spaced away from the outer crown in the rest position but which, when the power assistance mechanism is working, prevents the latter from rotating.

This blocking means preferably consists of a brake. In particular, this brake is constantly biassed by its spring into the rest position, spaced away from the outer surface of the outer crown. However, the brake can be applied by means of an electromagnetic solenoid coil which moves the brake away from its rest position and towards the position in which the outer crown is restrained, so that the latter can no longer rotate. The electromagnetic coil is, during the period in which power assistance is being applied, supplied with an excitation current which is derived from a D.C. voltage source through a controlled interruptor such as a power transistor or a relay. The control electrode of the interruptor receives, for this purpose, a control signal from a power assisted steering computer carried by the vehicle. The computer delivers such a control signal throughout each period of power assistance.

Further features and advantages of the present invention will be better understood on a reading of the description of a preferred embodiment of the invention which follows, and which also includes a description of an arrangement according to the prior art. The description is given with reference to the accompanying drawings.

DESCRIPTION OF A PREFERRED EMBODIMENT OF THE INVENTION

In its preferred form, the power assistance mechanism for a steering system in a motor vehicle is of the electromagnetic type. The actuating means comprises an electrical winding or coil which enables an element that selectively blocks and releases the rotation of the outer crown of an epicyclic speed reducing gear train to be displaced. In addition, using deformation of a resilient element, it is possible selectively to activate or de-activate the power assistance mechanism. It should also be noted that the invention has the further advantage that, when the power assistance is not in action, and in particular when it has broken down, the steering column can always be operated by hand.

In this preferred form of the electromagnetic power assistance mechanism in accordance with the invention, the mechanism comprises a speed reducer of the epicyclic type which comprises at least one outer crown which is free to rotate when power assistance is not being provided. Under these circumstances, the outer crown, which is free from rotation with the steering column or shaft, transmits no inertia to the rotating parts, and particularly not to the motor. With this in view, the actuating device comprises at least one electromagnet which, during actuation periods, draws against the outer crown a friction element or brake which is at other times continuously held away from the surface of the outer crown. When the outer crown is blocked in this way while the electromagnet is energised, the planet wheel carrier, which is coupled to the steering shaft or column, is in a position to transmit the assistance torque.

The power output pinion of the motor is coupled to the output pinion of the steering column through the epicyclic speed reducing mechanism. One of the moving parts of the latter is arranged so that it can be immobilised. By contrast, when the coil mentioned above is not energised, the outer crown is free and the motor is not coupled to the steering column.

Figure 1:
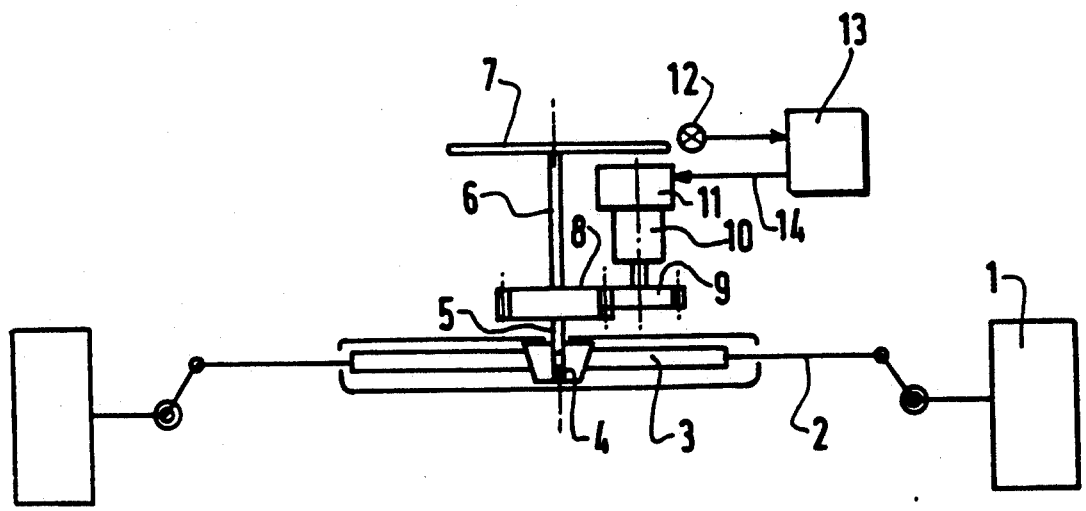
FIG. 1 is a general diagrammatic representation of a power assisted steering system for a motor vehicle according to the prior art.

Although FIG. 1 shows a system of the prior art, it is presented here so that the main elements incorporated in a power steering assistance mechanism according to the invention can be more readily understood. Referring therefore to FIG. 1, the vehicle has steerable front wheels 1, which are connected through a linkage, for example comprising steering arms 2, to a rack and pinion system comprising a rack 3 and a bevel gear wheel 4 in the usual way. The steering column consists of a shaft 6 coupled to a shaft 5 and carrying a drive gear or input wheel 8 at the junction of the two shafts 6 and 5. The bevel gear wheel or pinion 4 is mounted at the lower end of the shaft 5, and the normal steering wheel, controlled by the driver, is mounted at the upper end of the shaft 6. A sensor, represented in FIG. 1 by a detector 12, senses the force applied by the driver on the steering wheel 7. The detector 12 can measure, in particular, the angle of rotation of the steering wheel, or in addition the torque exerted by the driver on the steering wheel. The output signal from the detector 12 is passed to a computer 13 which generates a command signal at an output 14, and this command signal is transmitted to a motorised speed reducing unit 10, 11. The computer 13 is programmed to supply the speed reducing unit with current in such a way that the latter gives a power output which is variable according to the forces detected by the detector 12. This power output is transmitted via the drive gear 9 meshing with the main drive gear 8.

In low cost systems, the computer 13 receives a signal (not represented in FIG. 1) which represents the actual road speed of the vehicle. In accordance with this signal, the computer decides whether or not to select power assistance. However, if power assistance is not actuated, what happens is that the inertia of the whole of the movable part of the power assistance mechanism, i.e. the drive gear 9 together with the movable parts of the speed reducing unit 10, 11, causes an additional load to be applied on the upper steering column shaft 6, through its drive gear 8.

Figure 2:
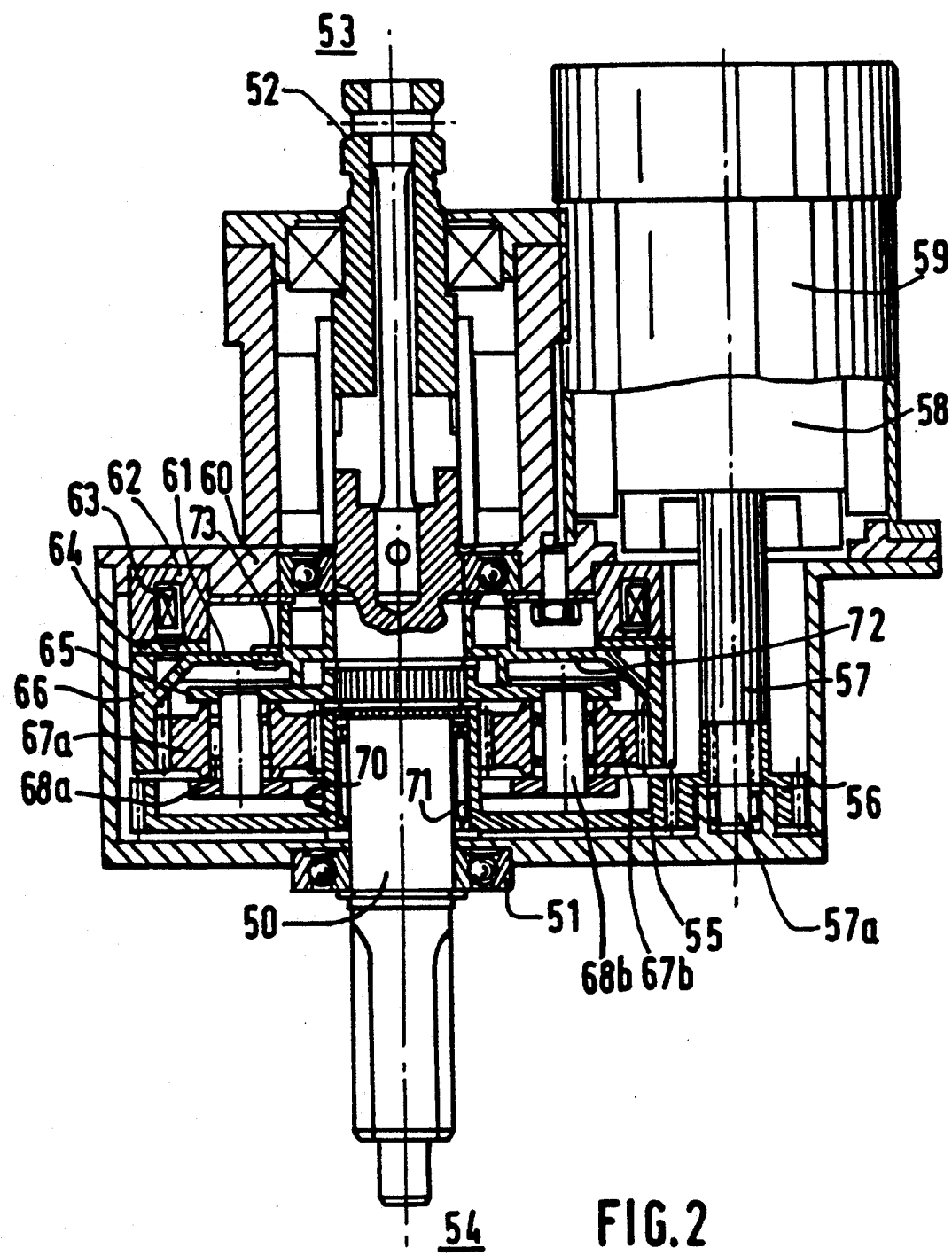
FIG. 2 shows in simplified cross section a power unit constituting a power assistance mechanism for a steering system in accordance with the invention.

Reference is now made to FIG. 2, showing the electromagnetic actuating device in which an electromagnet 63 operates a brake 64. When not in operation, this brake is separated from the outer crown 66 of the epicyclic speed reducer, in which the output wheel of the motorised speed reducing mechanism is represented by planet wheels 67a, 67b, while the input wheel or drive gear for the steering column is represented by the planet wheel carrier 65. FIG. 2 also shows the motorised speed reducing unit arranged to be mounted on the steering rack.

The steering column is indicated at 53, and comprises a shaft which is in two parts 50 and 52. The part 50 is the upper part of the steering column, which is coupled direct to the steering wheel, not shown. The steering column part 52 is the lower part, and this carries the pinion or gear wheel which engages the steering rack. Neither the rack nor its pinion are shown in FIG. 2. The motorised speed reducing unit is contained within a casing 60, and has two main constituent parts, the first of which is the electric motor 59, having a rotor 58 carrying a drive shaft 57 which terminates in an output wheel or drive pinion 56. The drive shaft 57 runs in a bearing 57a.

The second main constituent part is the epicyclic speed reducer, which comprises a first crown 55 which is toothed on its outer periphery and which meshes with the motor pinion 56. The steering column 53 enters the casing 60 through a rolling bearing 51. The first crown 55 is mounted for free rotation on a bearing 71 which is carried by the upper shaft 50 of the steering column. For this purpose, the first crown 55 carries a sleeve 70 which forms the outer ring of the bearing 71. The sleeve 70 is toothed externally so as to mesh with the planet wheels 67a and 67b. These planet wheels are also meshed with the internal teeth of the outer, or second, crown 66 of the speed reducing unit.

When the motor 59 is at rest, if the steering wheel is turned by the driver, thus rotating the upper shaft 50 of the steering column 53, the first crown 55 is not driven, since the movement of the steering column 53 is not transmitted to the shaft 71. The planet wheels 67a and 67b are mounted on the planet wheel carrier 65, which is force-fitted on the steering column 53. At this time the steering power assistance mechanism is out of service. The actuating device 63 (which will be described in detail below) is therefore in its inoperative or rest position. Therefore the second crown 66 is free to rotate, and, due to the inertia torque of the motor 59, the first crown 55 ceases to rotate. It follows that the reaction torque is not transmitted to the steering column, even if the planet wheels rotate on the two crowns 66 and 55.

When the actuating device 63 is activated, the blocking means which in this example comprise a friction brake 64, as will also be described later herein, is brought into contact with the second crown 66, which is thus prevented from rotating about the steering column upper shaft 50. When the motor 59 starts, the first crown 55 is driven by the motor through the motor pinion 56. The first crown 55 then rotates independently of the manual rotation exerted by the driver on the steering wheel. The rotation of the first crown 55 is transmitted to the planet wheels 67a and 67b through the sleeve 70. Since the outer crown 66 is now prevented from rotating, the motor torque is transmitted to the planet wheel carrier 65 secured to the steering column. Then, again since the outer crown 66 is blocked, the planet wheels, which are rotating about their axes 68a and 68b, are driven around the axis of the steering column, thus rotating the carrier 65 and therefore also the column 53 itself.

The preferred embodiment for the releasable blocking means, comprising a brake, will now be described, still with reference to FIG. 2. The second or outer crown 66 includes a base web portion 72 which joins its internally toothed outer ring portion to a ball bearing surrounding the steering column shaft 50. The base web portion 72 carries a spring 61 which is fixed at one end by means of a rivet 73 to the web portion 72, and at the other end to a friction ring 64 of rectangular cross section. The spring 61 is so designed that, in the rest position, the friction ring 64 is spaced away from the facing surface of the annular housing 62 of the electromagnet actuating device 63. This spacing is typically of the order of a few tens of millimeters. The electromagnet 63 comprises a toroidal solenoid coil 63, carried within the housing 60 and surrounding the steering column shaft 50 coaxially. The friction ring 64 is made of a magnetic material, so that when the solenoid coil is energised with an excitation current, the friction ring 64 is displaced from its rest position and comes into frictional contact with the facing surface of the annular housing of the solenoid coil 63. This locks the outer crown 66 against rotation.

It should be noted that since the magnetic field is proportional to the excitation current, then since the braking torque is proportional to the magnetic field, a means is provided for controlling the magnitude of the torque transmitted at any instant from the motor 59 to the steering column 50 for assisting the steering. In addition, any "pumping" or jerks in the steering column can thus be avoided. In this embodiment of the invention, the computer of the power assisted steering issues a command to an electrical interface device disposed between the solenoid coil 63 and its current supply source in response to the signals generally indicated in FIG. 1 as coming from the detector 12, and representing for example the road speed of the vehicle, the angle of rotation of the steering wheel and/or the instantaneous variation in this angle of the steering wheel. The computer then generates an appropriate actuating signal. Simultaneously, or with a predetermined positive or negative dephasing period, the computer produces a signal for energising the motor by connecting the source of electric current through a relay or power transistor which is interposed between the source and the electric motor. The power source may be the battery of the vehicle.

The interface mentioned above, which controls the solenoid coil 63, is so connected as to supply an excitation current having a wave form which corresponds to the desired evolution of the power assisting torque. The wave form is represented by the curve of evolution of the excitation current as a function of time. The computer thus controls supply of a current increasing with a ramp wave form, from a value at which the solenoid coil does not actuate the mechanism, up to a nominal value below which the mechanism is actuated. The ramp starts at the same instant as the initiation of power assistance. Similarly, before the end of the period of power assistance, the computer can be arranged so that the curve has a ramp of decreasing current.

In one embodiment, the interface mentioned above comprises a power transistor in which the path between the collector and the source is interposed between the source and one terminal of the coil 63. The other terminal of the coil is earthed. The grid electrode or emitter receives a control voltage $V_{GS}$ which over a period of time regulates the resistance between the drain and the source. Because of this, the current in the solenoid coil may be controlled according to a ramp wave form with a positive gradient, followed by a period in which it is maintained at its nominal value and then a ramp of decreasing current. To this end, the grid electrode is connected to a programmable voltage generator, set at zero and started by a command issued from the computer. The programmable voltage generator supplies the grid electrode with a predetermined control voltage $V_{GS}$.

It will be noted that the invention has been described in one particular embodiment. Other embodiments may be envisaged without departing from the scope of the invention as described in the Claims of this Application.

What is claimed is:

1. A discontinuously acting power assistance mechanism for a steering column of a vehicle having steerable wheels comprising a motorised speed reducer including a motor having a rotor, the motorised speed reducer including an epicyclic gear train, comprising a rotatable first crown having gear teeth, a sleeve carried coaxially by the first crown and having gear teeth, a second crown coaxial with the first crown, a planet wheel carrier carried by the steering column and meshing with the second crown, and planet wheels carried by the planet wheel carrier and meshing with the gear teeth of said sleeve, the mechanism further including a drive pinion carried by the rotor of said motor, said drive pinion meshing with the gear teeth of said first crown, the mechanism further including a releasable blocking means for restraining rotation of said second crown, and an actuator coupling the motorised speed reducer to the steering column only when the motor is activated so as to supply power assistance for the steering column, whereby in a rest position of the mechanism in which power for assistance is not being supplied by the motor, the second crown is free to rotate about the steering column, while when the motor is energised to supply power assistance, the second crown is prevented from rotating by said blocking means whereby the planet carrier is caused to rotate so as to rotate the steering column.

2. A mechanism according to claim 1, wherein the releasable blocking means comprise at least one friction member of magnetic material, and a spring joining the friction member to the second crown, said actuator comprising an electromagnetic solenoid coil associated with said friction member, means for detecting a condition calling for power assistance to the steering column, a steering power assistance computer connected to said detecting means and responsive to signals from said detecting means, a voltage source, and an interface means connected to the voltage source and to an output of the computer, for giving a variable output voltage in response to signals from the computer, the solenoid coil being connected to said interface means so as to receive said variable voltage whereby to cause the releasable blocking means to exert a controlled braking action on the rotational movement of said second crown.

3. A mechanism according to claim 2, wherein the solenoid coil is toroidal in shape and is disposed around the steering column, the mechanism further including a housing containing the solenoid coil and having a face directed towards the friction ring, said spring biasing said friction member away from said housing face when the solenoid is not energised, whereby when the solenoid coil is energised it causes the friction ring to come into braking engagement against said face of the housing.

4. A mechanism according to claim 2, wherein said interface is arranged to provide an excitation current for the solenoid coil in a predetermined wave form comprising a sequence in which a ramp of increasing gradient is followed by a zone of substantially zero gradient and then a ramp of decreasing gradient, such that said sequence is carried out by said interface means over the period during which power assistance is provided, the computer being adapted to deliver an actuation signal to the motor out of phase by an amount selected from zero, a positive amount, and a negative amount.

* * * * *